(12) United States Patent
Neely et al.

(10) Patent No.: US 9,988,139 B2
(45) Date of Patent: Jun. 5, 2018

(54) FAULT TOLERANT ELECTRONIC CONTROL ARCHITECTURE FOR AIRCRAFT ACTUATION SYSTEM

(71) Applicant: EATON CORPORATION, Cleveland, OH (US)

(72) Inventors: John David Neely, Kentwood, MI (US); Stanley Lawrence Seely, Kentwood, MI (US); John Mendenhall White, Hudsonville, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days. days.

(21) Appl. No.: 14/780,328

(22) PCT Filed: May 29, 2014

(86) PCT No.: PCT/US2014/040032
§ 371 (c)(1),
(2) Date: Sep. 25, 2015

(87) PCT Pub. No.: WO2014/194097
PCT Pub. Date: Dec. 4, 2014

(65) Prior Publication Data
US 2016/0068256 A1 Mar. 10, 2016

Related U.S. Application Data

(60) Provisional application No. 61/828,907, filed on May 30, 2013.

(51) Int. Cl.
*B64C 13/42* (2006.01)
*G05D 1/00* (2006.01)
*B64C 9/16* (2006.01)

(52) U.S. Cl.
CPC ............... *B64C 13/42* (2013.01); *B64C 9/16* (2013.01); *G05D 1/0077* (2013.01)

(58) Field of Classification Search
CPC .......... H04J 14/002; H04J 14/02; H04J 14/06; H04J 14/08; G05B 23/024; B64C 13/42;
(Continued)

(56) References Cited

U.S. PATENT DOCUMENTS 3,805,235 A * 4/1974 Foster ................ G01R 19/0038
244/194
3,919,961 A * 11/1975 McDougal ........... G05D 1/0206
114/144 E
(Continued)

FOREIGN PATENT DOCUMENTS

WO 2012/131330 A1 10/2012

OTHER PUBLICATIONS

European Patent Office; International Search Report and Written Opinion issued in corresponding International Application No. PCT/2014/040032. Dated Mar. 30, 2015.

*Primary Examiner* — Anne M Antonucci
*Assistant Examiner* — Sanjeev Malhotra
(74) *Attorney, Agent, or Firm* — Fishman Stewart PLLC

(57) ABSTRACT

An electronic control architecture for an aircraft actuation system may include a first channel and a second channel. The first channel may be configured to receive one or more inputs comprising a movement command, to produce an output to control a component of the system, and to receive feedback from the component respective of movement of the component. The first channel may comprise a fault detection module configured to compare the feedback to the command to determine if the first channel is functioning properly. The second channel may be configured to receive the one or
(Continued)

more inputs and, if the first channel is not functioning properly, to produce an output to control the component.

20 Claims, 3 Drawing Sheets

(58) Field of Classification Search
CPC .... B64C 9/20; B64C 9/28; G05D 1/00; B64D 2045/001
USPC ........ 701/1, 4, 18; 700/42; 702/185; 706/15; 714/14, 30, 752, 6.13; 114/144 E; 244/180, 50, 102 A, 194; 398/43, 53; 342/54; 361/20; 137/899.2; 348/659; 715/856; 475/266; 92/86; 169/43; 416/23; 324/537
See application file for complete search history.

(56) References Cited

U.S. PATENT DOCUMENTS

| | | | | |
|---|---|---|---|---|
| 4,114,842 | A * | 9/1978 | Hofferber | G05D 1/0066 244/180 |
| 4,472,780 | A * | 9/1984 | Chenoweth | G05D 1/0077 244/194 |
| 5,623,402 | A * | 4/1997 | Johnson | G05B 13/04 700/42 |
| 2002/0044316 | A1* | 4/2002 | Myers | H04J 14/002 398/43 |
| 2002/0080436 | A1* | 6/2002 | Hait | H04J 14/002 398/53 |
| 2002/0199131 | A1* | 12/2002 | Kocin | G11C 29/76 714/6.13 |
| 2003/0030582 | A1* | 2/2003 | Vickers | G01S 17/023 342/54 |
| 2003/0072051 | A1* | 4/2003 | Myers | H04J 14/002 398/43 |
| 2005/0250614 | A1* | 11/2005 | Lumpkin | B64C 13/28 475/266 |
| 2006/0044710 | A1* | 3/2006 | Beneditz | H02H 7/06 361/20 |
| 2007/0005528 | A1* | 1/2007 | Mukherjee | G05B 23/024 706/15 |
| 2007/0124113 | A1* | 5/2007 | Foslien | G05B 23/024 702/185 |
| 2007/0144342 | A1* | 6/2007 | Paulmann | F15B 15/149 92/86 |
| 2007/0150119 | A1* | 6/2007 | Mitchell | G06Q 50/30 701/1 |
| 2008/0005617 | A1* | 1/2008 | Maggiore | G07C 5/006 714/30 |
| 2008/0163948 | A1* | 7/2008 | Parrish | B64D 43/00 137/899.2 |
| 2008/0282201 | A1* | 11/2008 | Cabaret | G06F 3/038 715/856 |
| 2009/0144599 | A1* | 6/2009 | Leblond | G06F 11/3672 714/752 |
| 2010/0289963 | A1* | 11/2010 | LeFort | G06F 3/1423 348/659 |
| 2011/0155397 | A1* | 6/2011 | Icove | G01K 11/006 169/43 |
| 2011/0255968 | A1* | 10/2011 | Recksiek | B64D 45/0005 416/23 |
| 2011/0303785 | A1* | 12/2011 | Delloue | B64C 25/405 244/50 |
| 2012/0153963 | A1* | 6/2012 | Tyler | G01R 31/3277 324/537 |
| 2013/0204470 | A1* | 8/2013 | Luckner | G08G 5/025 701/18 |
| 2014/0172203 | A1* | 6/2014 | White | B64C 13/503 701/4 |
| 2014/0209738 | A1* | 7/2014 | Blanpain | B64C 25/20 244/102 A |

* cited by examiner

FAULT TOLERANT ELECTRONIC CONTROL ARCHITECTURE FOR AIRCRAFT ACTUATION SYSTEM

CROSS-REFERENCE TO RELATED APPLICATION

This application is a national stage filing based upon International Application No. PCT/US2014/40032, with an international filing date of May 29, 2014, which claims the benefit of U.S. provisional application No. 61/828,907, filed May 30, 2013, the disclosure of which is incorporated herein by reference in its entirety.

BACKGROUND

1. Technical Field

The present disclosure relates generally to the architecture of electronic control systems, including electronic control systems for electromechanical and hydraulic actuators, systems, and components.

2. Description of the Related Art

The functions of electromechanical, hydraulic, and other actuators may be controlled through an electronic control architecture. Known control system architectures generally include minimal, if any, redundancy or other measures for addressing faults. Thus, in a control architecture for one or more electromechanical, hydraulic, or other components (such as, for example, in an aircraft), failure of a single element of the control architecture may lead to failure of the entire actuation system.

Control architecture failure may be particularly problematic in the aircraft industry. The electromechanical, hydraulic, and other actuation systems of the aircraft are generally subject to FAA requirements to function for a minimum amount of time without failure (so-called "failure to actuate" requirements). For many such actuation systems, the control architecture (e.g., the small-signals processing elements of the architecture) may have a shorter and/or less predictable life span than the power drive electronics, mechanical components, and other portions of the system. Thus, the control architecture may be the most limiting portion of the functional life span of the broader system of which the control architecture is a part.

SUMMARY

Improving the functional lifespan (and/or operational availability) of a control architecture may improve the functional lifespan (and/or operational availability) of the broader system of which the control architecture is a portion. An approach that may improve the functional lifespan (and/or operational availability) of the control architecture without unduly increasing the cost of the system is to provide redundant control channels. An embodiment of such a control architecture for an aircraft actuation system may include a first channel and a second channel. The first channel may be configured to receive one or more inputs comprising a movement command, to produce an output to control a component of the system, and to receive feedback from the component respective of movement of the component. The first channel may comprise a fault detection module configured to compare the feedback to the movement to determine if the first channel is functioning properly. The second channel may be configured to receive the one or more inputs and, if the first channel is not functioning properly, to produce an outputs to control the component.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
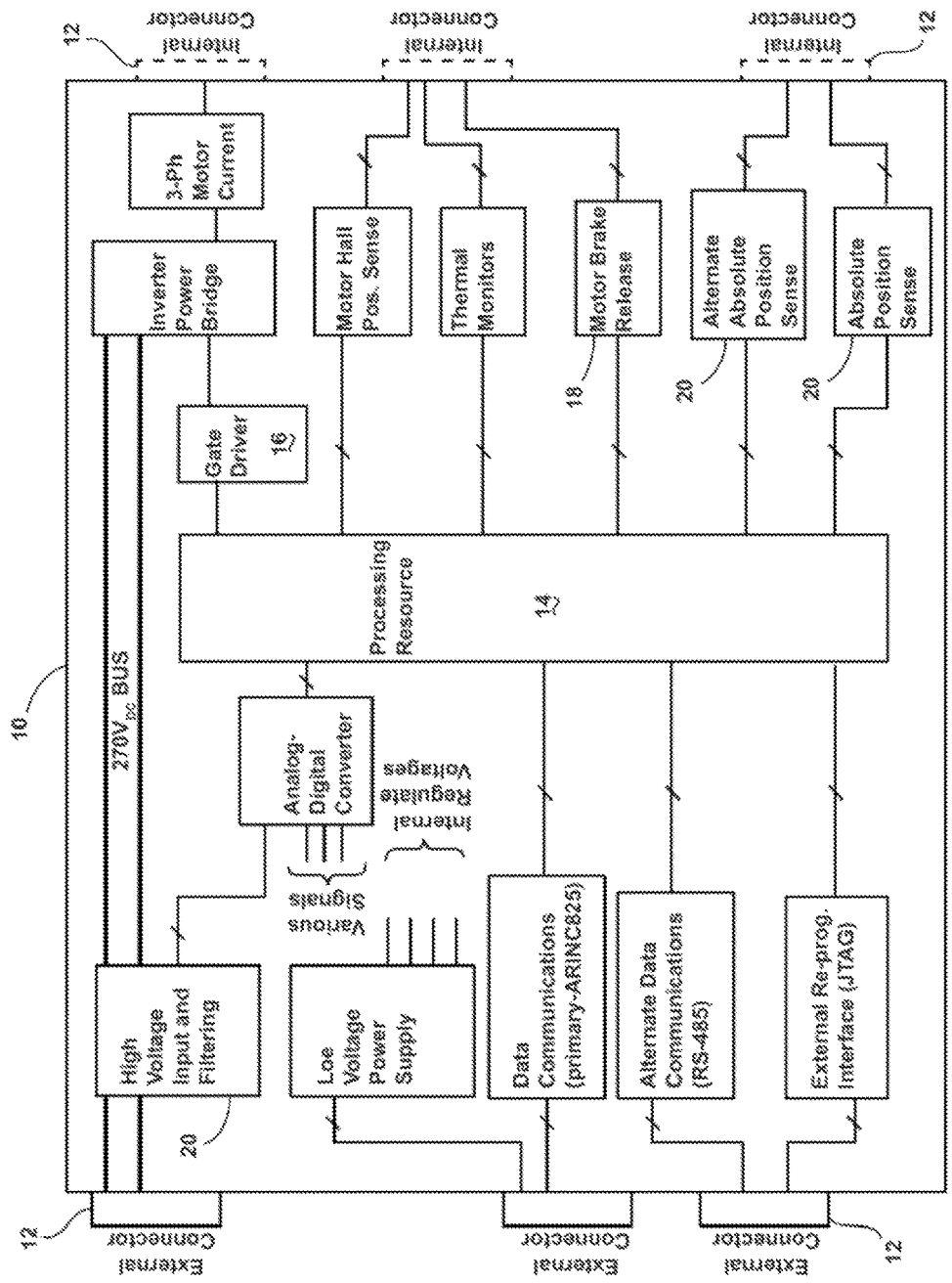
FIG. 1 is a schematic view of an exemplary embodiment of a single-channel electronic control architecture.
Figure 3:
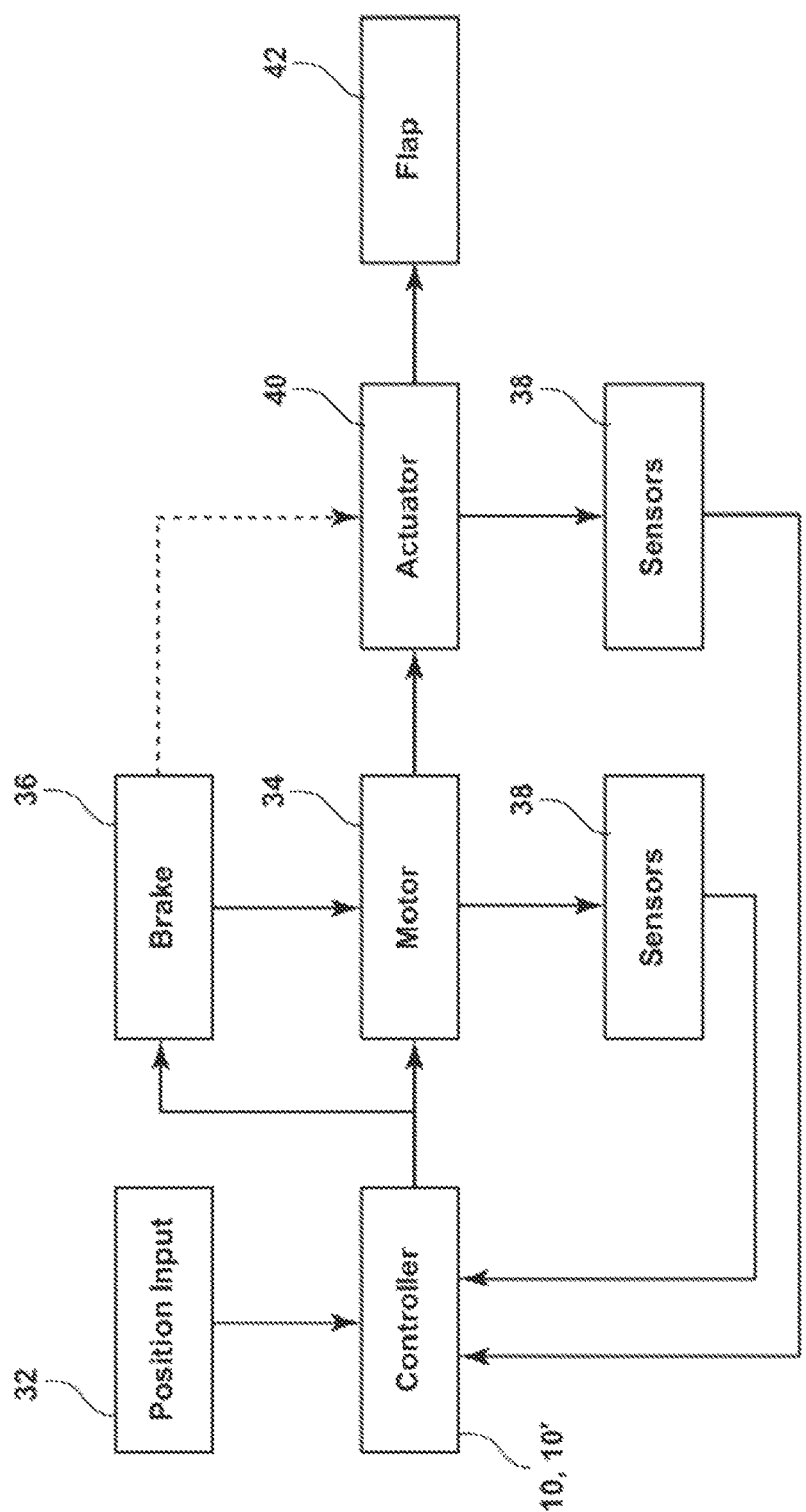
FIG. 3 is a block diagram view of an exemplary embodiment of an aircraft flap actuation system in which the control architectures of FIGS. 1 and 2 may find use.

Referring to the figures, in which like reference numerals refer to the same or similar features in the various views, FIG. 1 is a schematic view of an exemplary embodiment of a single-channel electronic control architecture implemented in a unitary controller 10. The controller 10 may be a portion of an actuation system, in an embodiment, such as the actuation system 30 of FIG. 3. Accordingly, the controller 10 may be coupled to an input device 32 (labeled "POSITION INPUT" in FIG. 3), a motor 34, a motor brake 36, and one or more sensors 38, in an embodiment, via one or more connectors 12 (not all of which connectors 12 are designated in FIG. 1, for clarity of illustration). The controller 10 may receive one or more inputs, which may include motor speed and direction commands, motor and/or actuator positions, and temperature, in an embodiment, from the input device 32 and/or the sensors 38. In the illustrated embodiment, the controller 10 may output control signals for one or more components of an actuation system, such as the motor 34 (which may be, for example, a three-phase motor) and a brake 36 that is coupled to the motor 34.

In an exemplary embodiment, the controller 10 may be a portion of an actuation system within an aircraft, such as a flap actuation system 30. In such an embodiment, the input device 32 may be an actuation position input (e.g., flight control system computer), which may provide flap extend and retract commands to the controller 10, and the controller 10 may be coupled to a motor 34 that provides power to an electromechanical linear flap actuator 40. In other embodiments, the controller 10 may be coupled to a hydraulic flap actuator and/or another type of actuator or actuation component.

The controller 10 may include a processing module 14, a power electronics device gate driver 16, a motor brake release 18, and a number of power and signal filtering, amplifying, and conditioning circuits 20 for various inputs and outputs. The processing module 14 may process the various inputs to the controller 10, including motor speed and direction commands, motor and/or actuator positions, and temperature to produce a control signal for a component to which the controller 10 is coupled. In an embodiment, the controller 10 may output a control signal for a motor 34, such as a three-phase motor, for example. The controller may also output a control signal for a motor brake 36.

The processing module 14 may be in communication with the gate driver 16, which may accept a low-current/small-signal level input from the processing module 14 and output a higher-power signal for the motor brake release 18, which may provide a release/engage signal for a brake 36 attached to the motor 34. In another embodiment, the brake 36 may be coupled to the actuator 40, as indicated by the dashed line in FIG. 3. In yet another embodiment, brakes may be provided for both the motor 34 and the actuator 40, both of which brakes may be coupled to and controlled by the controller 10.

Figure 2:
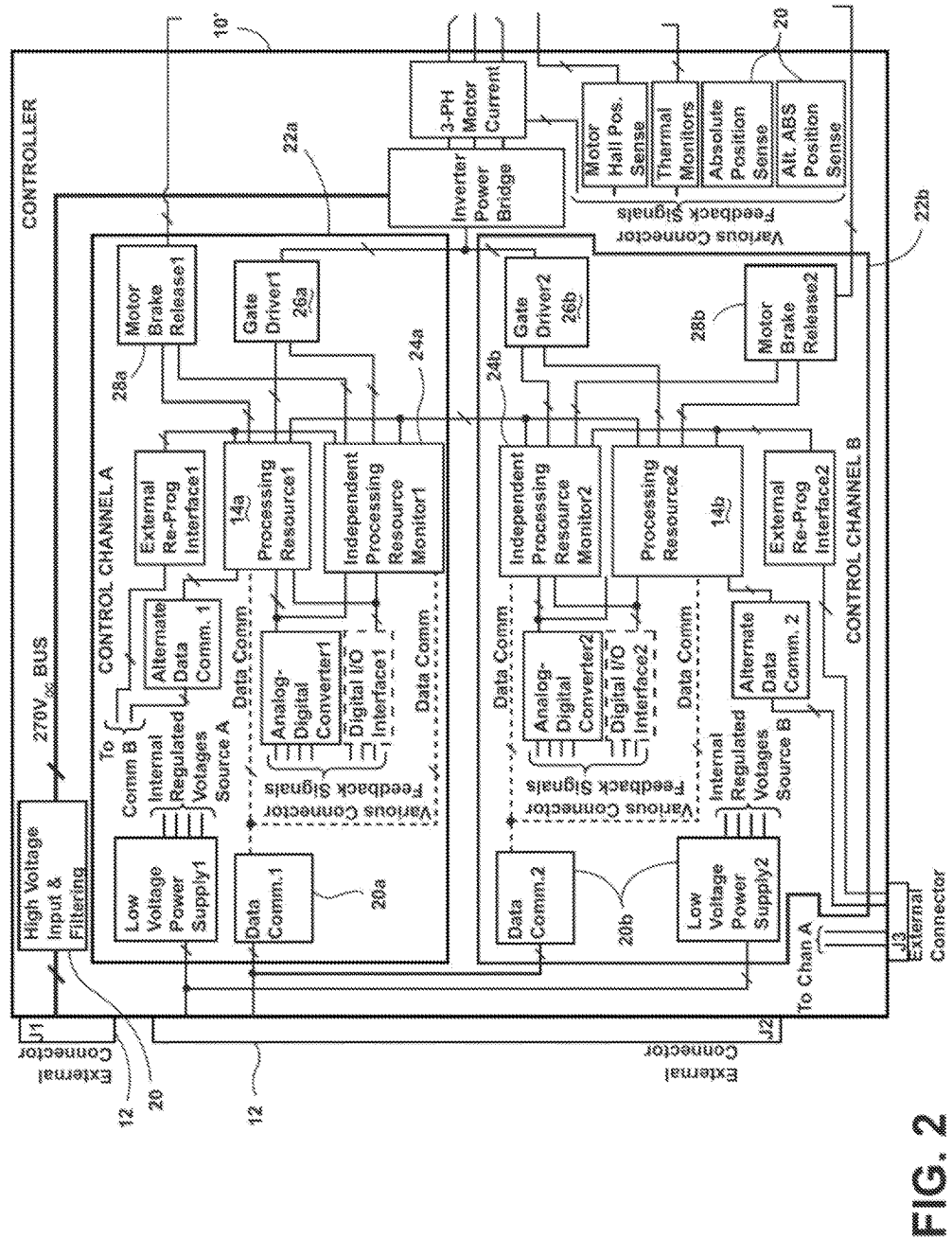
FIG. 2 is a schematic view of an exemplary embodiment of a two-channel electronic control architecture.

FIG. 2 is a schematic view of an exemplary two-channel electronic control architecture implemented in a unitary controller 10'. The controller 10' may be a portion of an actuation system, in an embodiment, such as the actuation system 30 of FIG. 3. Accordingly, the controller 10' may be coupled to an input device 32, a motor 34, a motor brake 36, and one or more sensors 38, in an embodiment, via one or more connectors 12 (not all of which connectors 12 are designated in FIG. 2, for clarity of illustration). Instead or in addition to a motor brake 36, an actuator brake may be provided and may be coupled to and controlled by the controller 10', in an embodiment (as indicated by the dashed line in FIG. 3). The controller 10' may receive a plurality of inputs, which may include motor speed and direction commands, motor and/or actuator positions, and temperature, in an embodiment, from the input device 32 and/or the sensors 38. In the illustrated embodiment, the controller 10' may output control signals for a motor 34, such as a three-phase motor, which may power, for example, an electromechanical actuator 40 for an aircraft flap 42.

Unlike the single-channel controller 10 of FIG. 1, the two-channel controller 10' includes redundancy to extend the life span of the controller 10' in the event of a fault. The controller 10' includes a first channel 22a and a second channel 22b, where the first channel 22a and the second channel 22b may be configured for redundant (e.g., substantially identical) functionality. Thus, the first channel 22a and the second channel 22b may receive the same set of inputs (e.g., commanded motor speed and direction, motor position, temperature, etc.), with only one channel 22 actively outputting control signals at a time. The first channel 22a and the second channel 22b may each have a respective processing module 14a, 14b, fault detection module 24a, 24b, gate driver 26a, 26b, motor brake release 28a, 28b, and a number of power and signal filtering, amplifying, converting, and conditioning circuits 20a, 20b for various inputs and outputs (not all of which circuits 20a, 20b are designated in FIG. 2, for clarity of illustration). Further power and signal filtering, amplifying, converting, and conditioning circuits may be shared by the channels 22a, 22b. At any given time, one channel 22a, 22b may have an active operational status in which it provides an output signal for controlling an actuation component (e.g., a motor), and the other channel 22a, 22b may have an inactive operational status in which is does not provide an output signal for controlling an actuation component.

Although shown as a unitary controller 10', the two-channel electronic control architecture may be implemented in one or more physical components, in embodiments. Furthermore, although particular modules and other electronic components 14, 14a, 14b, 16, 16a, 16b, 18, 18a, 18b, 20, 20a, 20b, 24a, 24b are described above and below, the functions of those modules and other electronic components are not limited to the particular embodiments shown. Rather, functions shown and described with respect to one or more modules or other electronic components may be combined into a single integrated circuit (IC) chip, circuit, module, etc. or separated into multiple IC chips, circuits, modules, etc. as appropriate for a particular application or embodiment. Furthermore, functions of modules and other electronic components may be implemented in analog or digital circuits, software, reconfigurable logic devices (e.g., PLDs, FPGAs), and/or any other known processing means. It may, however, be preferred and/or advantageous to implement the two channels of the controller in a single device, chip, etc., for simplicity of installation, maintenance, and replacement, in an embodiment.

Each processing module 14a, 14b may be configured to process the various inputs to the controller, including motor speed and direction commands, motor torque and/or applied current, motor and/or actuator positions, and temperature to produce one or more control signals for a three-phase motor and for a brake coupled to the motor. The processing module 14a, 14b may be in communication with the gate driver 26a, 26b within its channel 22a, 22b, which may accept a low-current input from the processing module 14a, 14b and output a higher-power signal and with the motor brake release 28a, 28b within its channel 22a, 22b, which may provide a release/engage signal for a brake attached to the motor.

Each processing module 14a, 14b may be configured to coordinate or synchronize the motor and the motor brake by coordinating or synchronizing control signals for the motor and the motor brake. In an embodiment, when the motor brake is engaged and is to be disengaged for the motor to be driven, the processing module 14a, 14b may be configured to delay motor drive commands for a period of time after a brake release command to prevent inadvertent wear of the motor brake. The delay may be for a predetermined period of time, in an embodiment. For the same reason, when the brake is to be engaged, the processing module 14a, 14b may substantially simultaneously cease motor drive commands (or issue a motor drive control signal of zero speed) and output a brake engage command, in an embodiment. In another embodiment, the processing module 14a, 14b may be configured to delay a motor brake engage command after ceasing motor drive commands or outputting a motor drive control signal of zero speed.

Each fault detection module 24a, 24b may be configured to detect faults in the operation of its channel 22a, 22b (where fault detection module 24a is a part of channel 22a and fault detection module 24b is a part of channel 22b) and, in an embodiment, of the other channel 22a, 22b. In an embodiment, the processing module 14a, 14b and the fault detection module 24a, 24b within a channel 22a, 22b may be independent of each other (i.e., may have independent processing resources). The fault detection module 24a, 24b may receive the one or more inputs, including movement commands, that are also received by the processing module 14a, 14b and feedback from one or more components controlled by the controller. Based on one or more of the inputs and the feedback, the fault detection module 24a, 24b may determine if its channel 22a, 22b is functioning properly or if its channel 22a, 22b has a fault in its operation. For example, each fault detection module 24a, 24b may receive feedback from sensors coupled to a motor informing the fault detection module of the speed and/or position of the motor (thereby providing the speed and/or position of the actuator to which the motor is coupled, as well). The fault detection module 24a, 24b may compare the speed and/or position of the motor (or actuator) to the commanded speed and/or position. If the feedback and the commanded movement are in agreement, consistent with each other, or otherwise indicate that the movement of the motor (or the movement of the actuator) matches the commanded movement, the fault detection module 24a, 24b may determine that its channel 22a, 22b is functioning properly. If, on the other hand, the feedback and the commanded movement are not in agreement, inconsistent with each other, or otherwise indicate that the movement of the motor (or actuator) does not match the commanded movement, the fault detection module 24a, 24b may determine that there is a fault in its channel 22a, 22b such that the channel 22a, 22b is not functioning properly.

Although described above and below generally with monitoring and assessing the state of its own channel 22a, 22b, one or more of the fault detection modules 24a, 24b may be configured to monitor the other channel 22a, 22b, both channels 22a, 22b, only the active channel 22a, 22b, or only the inactive channel 22a, 22b.

In addition to commanded and actual movement, each fault detection module 24a, 24b may also receive and assess other information to determine if there is a fault in its channel 22a, 22b. For example, the fault detection module 24a, 24b may examine voltages at one or more points in the channel 22a, 22b to determine if the voltages are within an acceptable range. Further, the fault detection module 24a, 24b may examine the movement command input to determine if it is valid.

In an embodiment, the fault detection module 24a, 24b of the active channel 22a, 22b only may determine whether the active channel 22a, 22b is functioning properly or not. In such an embodiment, the inactive channel 22a, 22b may rely on the active channel's fault detection module 24a, 24b to determine when to switch from inactive to active. In another embodiment, the fault detection modules 24a, 24b of both channels 22a, 22b may determine whether the active channel 22a, 22b is functioning properly or not, and agreement may be required in order for the active channel 22a, 22b to remain active.

The fault detection module 24a, 24b of each channel 22a, 22b may output an indication of the operational status (e.g., an active/inactive signal) of the channel 22a, 22b to the other channel 22a, 22b. In an embodiment, this may be used by the active channel 22a, 22b to determine if the inactive channel 22a, 22b agrees with the active channel's determination as to the active channel's operational status and/or by the inactive channel 22a, 22b to determine whether it should become active.

The fault detection module 24a, 24b may also output an indication of the operational status (e.g., an active/inactive signal) of the channel 22a, 22b to the motor brake release 28a, 28b and the gate driver 26a, 26b of that channel 22a, 22b. The motor brake release 28a, 28b and the gate driver 26a, 26b may each include suppression logic that prevents an output signal (i.e. from the motor brake release 28a, 28b and/or gate driver 26a, 26b to the motor brake and/or the motor) if the channel 22a, 22b in which the suppression logic is disposed is not the active channel (based on the operational status signal from the fault detection module 24a, 24b) and allows an output signal if the channel 22a, 22b is the active channel. In another embodiment, such suppression logic may be implemented elsewhere in the controller (such as, for example, in the processing module 14a, 14b or the fault detection module 24a, 24b of each channel).

The inactive channel 22a, 22b may operate in a standby/monitoring mode, in an embodiment, in which the inactive channel 22a, 22b may not produce an output control signal for the motor and/or for the motor brake release 28a, 28b (or, in other embodiments, for any component controlled by the controller 10'). As described above, in the inactive channel 22a, 22b, output signals may be suppressed by suppression logic. In the standby/monitoring mode, the inactive channel fault detection module 24a, 24b may further monitor the validity of input signals, determine if the active channel 22a, 22b is functioning properly, and generally perform substantially the same functions as the active channel fault detection module 24a, 24b, in an embodiment.

The inactive channel 22a, 22b (e.g., through its fault detection module 24a, 24b and suppression logic) may be configured to enter active mode when the active (i.e., previously active) channel 22a, 22b becomes inactive (e.g., due to a fault). The switch from the first channel 22a being active to the second channel 22b being active (or vice-versa) may be transparent to the other components of the system of which the controller 10' is a part. Accordingly, the controller 10' may provide an extended lifespan (and/or operational availability) (i.e., as compared to a single-channel controller 10) that appears substantially the same to the rest of the system.

In an embodiment, the controller 10' may be configured to perform a functionality test in which each channel 22a, 22b is active for a period of time (e.g., following system startup) in order to ensure that both channels 22a, 22b are functioning properly. In an embodiment, such a functionality test may be performed as part of a boot sequence. For example, the controller 10' may be configured for the first channel 22a to be the active channel for a first brief period of time following system startup, then the second channel 22b may be the active channel for a second brief period of time. If both channels 22a, 22b are functioning properly, control may return to the first channel 22a as the active channel for as long as it functions properly. If one of the channels 22a, 22b is not functioning properly in the functionality test, the functioning channel 22a, 22b may continue as the active channel.

In an embodiment, the first channel 22a may be the default (e.g., initial) active channel. That is, if both channels 22a, 22b are capable of functioning properly, the first channel 22a may be the active channel. In another embodiment, the channels 22a, 22b may be configured to switch between active and inactive (assuming both channels 22a, 22b are capable of functioning properly) at discrete or predetermined intervals.

The two-channel electronic control architecture embodied in the controller 10' may enable an increased lifespan (and/or operational availability) of an actuation system without significantly increasing the cost of the system. Because the small-signals processing components in the control architecture of the actuation system may be the most limiting elements to the lifespan (and/or operational availability) of the system, the two-channel architecture embodied in the controller 10' may be paired with single (i.e., non-redundant) components throughout the rest of the system, including power drive electronics, motors, hydraulic components, and actuators. Thus, the lifespan (and/or operational availability) of the entire system may be increased without requiring redundancy of many portions of the system. Furthermore, because the switch from one channel 22a, 22b as the active channel to the other channel 22a, 22b as the active channel may be transparent to the system, and because the two channels 22a, 22b may be implemented on a single chip or device that substantially resembles a single-channel controller 10 (e.g., in its input/output configuration), the two-channel controller 10' may be added to an actuation system to improve the lifespan (and/or operational availability) of the system without requiring a redesign of any other portion of the system.

The teachings of this disclosure are not limited to use in an aircraft flap actuation system, or in aircraft systems more broadly. Furthermore, the teachings of this disclosure are not limited to use with electric motor systems. Instead, the teachings of this disclosure may be applied to numerous different fields and applications, including hydraulic and other actuation systems. Accordingly, it should be understood that references herein to aircraft embodiments are exemplary in nature only and are not limiting except as explicitly recited in the claims. Furthermore, although only single-channel and two-channel embodiments are explicitly illustrated and discussed herein, the teachings of this disclosure may be applied to a control architecture having any number of wholly or partially redundant channels.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed:

1. A system having a control architecture for an aircraft, comprising:
   a multi-channel controller including a first channel and a second channel that are redundantly paired with a single physical component of said aircraft, wherein the first and second channels are operationally coupled to alternate between an active operational status and an inactive operational status;
   the first channel in the active operational status being configured to receive one or more inputs comprising a movement command, to produce an output to control a movement of the single physical component of said aircraft based on the one or more inputs, and to receive feedback from the single physical component respective of the movement of the single physical component, the first channel comprising a fault detection module configured to compare the feedback to the movement command to determine if the first channel is functioning properly; and
   the second channel in the inactive operational status being configured for redundant functionality while the first channel is in the active operational status and to receive the one or more inputs of the first channel and, in response to the first channel not functioning properly based on the fault detection module of the first channel, switch to the active operational status to produce an output to control the movement of the single physical component while the first channel switches to the inactive operational status.

2. The system of claim 1, wherein the second channel is in communication with the first channel, further wherein the first channel informs the second channel when the fault detection module determines that the first channel is not functioning properly.

3. The system of claim 1, wherein the single physical component comprises one or more of an electromechanical actuator, a hydraulic actuator, an actuator brake, and a motor brake.

4. The system of claim 3, wherein the single physical component is mechanically coupled with an aircraft flap.

5. The system of claim 1, wherein the fault detection module is a first module, the system further comprising a second module configured to generate the output, wherein the first module is independent of the second module.

6. The system of claim 5, wherein the second module is a processing module.

7. The system of claim 6, wherein the processing module is a first processing module, wherein the second channel comprises a second processing module.

8. The system of claim 1, wherein the feedback is received from a sensor coupled to the single physical component.

9. The system of claim 8, wherein the sensor comprises one or more of a rotary motor position sensor, and an absolute position sensor.

10. The system of claim 1, wherein the second channel is configured to not produce an output to control movement of the single physical component unless the first channel is not functioning properly.

11. A method of controlling a movement of an aircraft component, the method comprising:
    providing a multi-channel controller including a first channel and a second channel that are redundantly paired with the aircraft component, wherein the first and second channels are operationally coupled to alternate between an active operational status and an inactive operational status;
    receiving, with the first channel in the active operational status, one or more inputs comprising a movement command;
    producing, with the first channel, an output to control the movement of the aircraft component based on the one or more inputs,
    receiving feedback from the aircraft component respective of the movement of the aircraft component;
    comparing the feedback to the movement command to determine if the first channel is functioning properly; and
    receiving, with the second channel in the inactive operational status being configured for redundant functionality while the first channel is in the active operational status, the one or more inputs of the first channel and, in response to the first channel not functioning properly based on a fault detection module of the first channel, switch to the active operational status to produce an output with the second channel to control the movement of the aircraft component while the first channel switches to the inactive operational status.

12. The method of claim 11, wherein the second channel is in communication with the first channel, wherein the method further comprises:
    receiving, with the second channel and from the first channel, an indication that the first channel is not functioning properly.

13. The method of claim 11, wherein the aircraft component comprises one or more of an electromechanical actuator, a hydraulic actuator, an actuator brake, and a motor brake.

14. The method of claim 11, wherein the feedback is received from a sensor coupled to the aircraft component.

15. The method of claim 14, wherein the sensor comprises one or more of a rotary motor position sensor, and an absolute position sensor.

16. The method of claim 11, wherein producing an output with the second channel to control movement of the aircraft component is only performed if the first channel is not functioning properly.

17. The method of claim 11, wherein comparing the feedback to the command to determine if the first channel is functioning properly is performed by a fault detection module associated with the first channel.

18. The method of claim 17, wherein comparing the feedback to the command to determine if the first channel is functioning properly is also performed by a fault detection module associated with the second channel.

19. A control architecture for an aircraft system, comprising:
   a multi-channel controller including a first channel and a second channel that are redundantly paired with a single physical component of said aircraft system, wherein the first and second channels are operationally coupled to alternate between an active operational status and an inactive operational status;
   the first channel comprising:
      a processing module in the active operational status being configured to receive one or more inputs comprising a movement command and to produce an output to control a movement of the single physical component based on the one or more inputs, and
      a fault detection module configured to receive feedback from the single physical component respective of the movement of the single physical component and compare the feedback to the movement command to determine if the first channel is functioning properly; and
   the second channel in the inactive operational status being configured for redundant functionality while the first channel is in the active operational status and to receive the one or more inputs of the first channel and, in response to the first channel not functioning properly based on the fault detection module of the first channel, switch to the active operational status to produce an output to control the movement of the single physical component while the first channel switches to the inactive operational status.

20. The control architecture of claim 19, wherein the second channel comprises a processing module configured to receive the one or more inputs and to produce an output signal.

* * * * *